United States Patent [19]
Schievelbusch

[11] Patent Number: 5,236,403
[45] Date of Patent: Aug. 17, 1993

[54] DRIVING HUB FOR A VEHICLE, PARTICULARLY A BICYCLE, WITH AN INFINITELY VARIABLE ADJUSTABLE TRANSMISSION RATIO

[75] Inventor: Ulrich Schievelbusch, Kassel, Fed. Rep. of Germany

[73] Assignee: Fichtel & Sachs AG, Schweinfurt, Fed. Rep. of Germany

[21] Appl. No.: 930,724

[22] Filed: Aug. 14, 1992

[30] Foreign Application Priority Data

Aug. 16, 1991 [DE] Fed. Rep. of Germany ....... 4127030

[51] Int. Cl.$^5$ ............................................. F16H 17/02
[52] U.S. Cl. ...................................... 476/38; 476/47; 476/61; 475/189; 475/196; 280/236; 280/238
[58] Field of Search ...................... 476/36, 37, 38, 47, 476/48, 61, 63; 475/189, 196; 280/236, 238

[56] References Cited

U.S. PATENT DOCUMENTS

| | | | |
|---|---|---|---|
| 2,469,653 | 5/1949 | Kopp | 476/37 |
| 2,675,713 | 4/1954 | Acker | 476/37 X |
| 2,931,234 | 4/1960 | Hayward | 476/37 |
| 2,931,235 | 4/1960 | Hayward | 476/37 X |
| 4,735,430 | 4/1988 | Tomkinson et al. | 280/236 |

FOREIGN PATENT DOCUMENTS

| | | |
|---|---|---|
| 0432742 | 6/1991 | European Pat. Off. |
| 2136243 | 2/1972 | Fed. Rep. of Germany |
| 3940919 | 6/1991 | Fed. Rep. of Germany |
| 55-135259 | 10/1980 | Japan ................... 476/38 |
| 592320 | 10/1947 | United Kingdom |
| 1376057 | 12/1974 | United Kingdom ................... 476/38 |
| 2035482 | 6/1980 | United Kingdom ................... 476/38 |

OTHER PUBLICATIONS

F. R. Whitt et al., "Bicycling Science", MIT Press, 1988, p. 282.

Primary Examiner—Allan D. Herrmann
Assistant Examiner—William O. Trousdell
Attorney, Agent, or Firm—Brumbaugh, Graves, Donohue & Raymond

[57] ABSTRACT

A driving hub for a vehicle, particularly a bicycle, comprising a hub axle, a hub sleeve enclosing the hub axle, a driver, a friction gear, a coupling arrangement as well as a control arrangement for infinitely variable adjustment of the transmission ratio of the friction gear, is provided with a ball friction gear comprising a driving ring and a driven ring, a plurality of friction balls frictionally connecting the rings to one another, a friction ball carrier rotationally rigidly connected to the hub axle and a control arrangement for jointly pivoting of the ball spindles, said driving ring and said driven ring being in frictional contact with the friction balls on the respective side of the friction balls which faces away from the axis. A driving hub of this kind is of simple design, can be produced inexpensively and exhibits a high degree of efficiency.

26 Claims, 3 Drawing Sheets

DRIVING HUB FOR A VEHICLE, PARTICULARLY A BICYCLE, WITH AN INFINITELY VARIABLE ADJUSTABLE TRANSMISSION RATIO

BACKGROUND OF THE INVENTION

The invention relates to a driving hub for a vehicle, particularly a bicycle, with a friction gear of which the transmission ratio is infinitely adjustable.

Known from the manual entitled "Bicycling Science", Frank Rowland Witt, David Gordon Wilson, The MIT Press, Cambridge, London, 1988, 2nd edition, page 282 are a number of principles concerning the construction of friction gear mechanisms, attention being drawn to the problems of such friction gears when used in conjunction with bicycle hubs. These problems reside in the fact that with bicycle hubs, relatively high torque levels have to be transmitted at low rotary speeds, it being intended that the transmission ratio be so adjustable that, according to requirements, so the hub sleeve will rotate more rapidly or more slowly than the driver. One of the types of construction shown in principle is a friction gear in the form of a ball friction gear, where friction balls rigidly mounted on angularly adjustable ball spindles are able to roll on the conical outer periphery of both a driving wheel and also of a driven wheel in order to transmit a corresponding torque from the driving pulley to the driven pulley.

DE-21 36 243 A1 discloses a stationary gear mechanism with an input shaft and an output shaft coaxial with it. The friction balls used here are mounted to be freely rotatable and roll on a total of four bearing surfaces which are adjustable in relation to one another, the axis of rotation of the balls adjusting itself accordingly. The drive of the friction balls is effected via an inclined outer peripheral surface of a driving pulley which is connected to the driving axle. An expanding coupling is provided to increase the applied pressure as the torque increases. The construction of this gear mechanism is complicated. A direct and precise adjustment of a desired transmission ratio is not possible. The fixed casing in which there is inter alia a drive worm of the control arrangement cannot be replaced by a rotating hub sleeve.

The U.S. Pat. No. 4,735,430 discloses a driving hub for bicycles with a friction gear based on the principle of torque transmission by means of friction wheels which roll on toroidal surfaces of mutually opposite toroidal discs. In contrast to conventional driving hubs, in this case the hub axle is rotatably mounted in the bicycle frame so that special installation means are required. Also, a planetary gear mechanism is necessarily provided in order to drive the hub sleeve in the direction of rotation of the driver; however, this impairs the efficiency of the driving hub and increases the structural cost as well as the hub weight.

An improvement to this hub is disclosed by EP 0 432 742 A1. As is conventional with bicycles, the hub axle can be rigidly installed within the bicycle frame with, for friction gear control, a linkage which extends through the hollow hub axle. Also this bicycle hub works on the principle of the toroidal discs. In order to adjust the rotary speed range of this hub to the transmission ratios which are normally found in bicycles, an additional planetary gear mechanism is required which in turn impairs the efficiency of the driving hub and increases the structural cost as well as the hub weight.

SUMMARY OF THE INVENTION

It is an object of the invention to provide a vehicle driving hub the transmission ratio of which is infinitely adjustable. It is intended that the driving hub should be of simple and inexpensively produced construction. Furthermore the efficiency should be high.

The invention is based on a driving hub for a vehicle, particularly a bicycle, comprising a hub axle which establishes an axis of the hub, a hub sleeve which equiaxially encloses and is rotatable in relation to the hub axle, a driver mounted to rotate in relation to the hub sleeve and the hub axle, a friction gear disposed inside the hub sleeve in the path of force between the driver and the hub sleeve, at least one coupling arrangement which, when the drive is being provided by the driver, closes the path of force between driver and hub sleeve and opens the path of force when the driver is not driving, a control arrangement which can be actuated from outside, for the infinitely variable adjustment of the transmission ratio of the friction gear.

The improvement according to the invention resides in the fact that the friction gear is constructed as a ball friction gear, comprising two axially oppositely disposed rings, a driving ring and a driven ring, distributed in the peripheral direction of the rings and connecting the rings to one another frictionally, a plurality of friction balls which are rotatably mounted by means of ball spindles and rotationally rigidly connected to the hub axle a friction ball carrier on which the friction balls with their ball spindles are mounted to pivot in a plane containing the axis of the hub, and in that the driving ring and the driven ring are in frictional contact with the friction balls on the side of the friction balls which is remote from the axis and in that the control arrangement is constructed for joint pivoting of the ball spindles.

Frictional contact between the friction balls and driving ring and driven ring takes place on rolling circles of relatively large diameter so that by reason of the resultant long torque lever arm even high levels of torque can be transmitted without difficulty. The driving forces which press the balls against the rings to guarantee an as far as possible low-slip entrainment can therefore be kept within tolerable limits. It is also possible to use balls of relatively small diameter, which thus require a correspondingly small space for installation. The number of balls can therefore be increased compared with the number of wheels in the case of friction drives constructed on the toroidal principle, so that the torque to be transmitted per ball is reduced accordingly. The force applied is distributed over a greater number of points of contact with a correspondingly lesser loading on the contact points. A planetary gear mechanism on the downstream side is not required since the direction of rotation is not reversed by the friction gear mechanism and the transmission ratio can easily be so selected that the rotary speed of the hub sleeve is optionally smaller, equal to or greater than the rotary speed of the driver. Compared with a friction gear mechanism on the toroidal principle, the span of the possible transmission ratios can be chosen markedly greater while the demands on manufacturing accuracy are reduced.

According to a preferred embodiment of the driving hub according to the invention, the hub axle is constructed in two parts with two half-axles on the ends disposed inside the hub and spaced apart from each other there is in each case a rotationally rigidly mounted ball carrier disc and the ball carrier discs are rigidly connected to each other to form a transmission housing and the transmission housing is constructed as a friction ball carrier. By this division of the hub into two parts, the gap between the inner hub ends inside the hub can be utilised in particular to accommodate parts of the control arrangement, promoting the compact construction of the hub. Assembly is simplified. Once the corresponding parts of the control arrangement have been installed, the two half-axles can preferably be fitted rigidly together by means of the ring which rigidly connects the two ball carrier discs so that a per se stable pre-assembly unit is obtained which can then be fitted into the hub sleeve. The parts, particularly the control arrangement, can be produced to a high degree of precision and installed. Also, an accurate alignment of the half-axles is guaranteed so that the reliable functioning of all parts is guaranteed even after prolonged use. The driving hub can be installed on the bicycle frame without any problem so that no specially prepared vehicle frames are required.

The ball spindles of the friction balls are so pivoted by the control arrangement that the central pivot point coincides as accurately as possible with the centre point of the balls. To ensure that in addition the pivot plane of the particular ball spindle lies in one plane with the axis of the hub, it is proposed that the ball carrier discs be provided with radially extending grooves to receive the corresponding ends of the ball spindles. Preferably, it is envisaged that the ends of the ball spindles be provided with sliding blocks which are inserted into the radially extending grooves in the ball carrier discs. In order to ensure low-friction operation, it is suggested that the grooves be of a width which corresponds to that of the sliding blocks plus a reasonable clearance for movement.

In order to obtain the desired pivoting movement of the spindles of the friction balls by structurally simple means, it is suggested that the control arrangement comprise a pivot spindle and, rotationally rigidly coupled thereto, two cam plates, the cam plates being disposed on either side of the friction balls so that the ends of the ball spindles bear on the cams of the cam plates, the cams being constructed to have pitch directions extending in opposition to each other, for pivoting the ball spindles about the central point of the friction balls upon rotation of the cam plates relative to the friction ball carrier. In this respect, it is preferable for the friction balls to be rotatably mounted on their ball spindles, both ends of these ball spindles being connected to sliding blocks which in turn contact the cams on the cam plates. Furthermore, it is proposed that the contact surfaces of the sliding blocks, with the cams on the cam plates, be constructed in the form of ball cups.

The sliding blocks guided in the radial grooves in the housings of the ball carrier discs, by reason of their spherical contact surface, follow the cams on the cam plates with neither clearance nor friction. These cams are so constructed that upon a rotating actuation of the control arrangement one of the two sliding blocks is pressed by one cam radially outwardly while the other sliding block mounted at the opposite end of the relevant ball spindle, is pushed radially inwardly by this pressure, causing pivoting about the ball centre. The cam for this pushed sliding block can be readily so constructed that it bears closely and once again without notable clearance on this pushed sliding block. Upon reversal of the direction of controlling rotation, therefore, the ball spindle is even pivoted straight away in the opposite direction without any notable clearance occurring at this change of direction. Clearance between one of the sliding blocks and its cam plate would result in a troublesome backlash in the control arrangement.

The demands on the cams are satisfied when, as proposed by the invention, these are constructed symmetrically in relation to one another so that they merge into one another when rotated through 180° about a pivot axis at right-angles to the axis of the hub.

According to the invention, therefore, the control arrangement is actuated from outside in that a control element which passes through the hollow driving hub is rotated forwards or backwards in order accordingly to obtain low gear or high gear characteristics in the hub. This rotary movement can be triggered electrically or manually, particularly by means of a corresponding twist grip. Optionally, the rotary movement can also be converted to the usual linear movement.

In order to relieve the bearings of the friction balls, particularly the cam plates, of radial forces while at the same time guaranteeing good frictional contact between the balls and the rings, it is suggested that all friction balls be supported on the outer periphery of a ring mounted in the driving hub and to rotate about the axis.

In order to be able optionally to vary the pressure by which the balls are applied against the driving ring or driven ring, particularly in order to be able to increase it at relatively high torque, it is proposed that the ring be mounted for axial movement in the driving hub and have, inclined to the axis, a portion of the peripheral surface on which the friction balls are able to roll to pre-tension the friction balls outwardly by corresponding axial displacement of the ring in a pre-tensioning direction.

In all operating modes of the driving hub, therefore also during approximately torque-free starting, in order to ensure a sufficient frictional connection between the friction balls and driving ring and driven ring, a pre-tensioning spring element preferably in the form of a plate spring, is suggested for axially pre-tensioning the ring in the pre-tensioning direction.

In order to achieve a self-centering function and in addition to ensure a radial pressure of application which gradually increases with the lateral displacement of the ring, it is proposed that the outer periphery of the ring comprise a middle portion of toroidal concave curvature with a torus radius exceeding the radius of the friction balls as well as, adjacent to both its sides in an axial direction, a conical portion having a diameter which increases with increasing distance from the middle portion.

The control arrangement is preferably provided with a restoring spring which pre-tensions it into a starting position so that corresponding spring elements outside the driving hub are unnecessary. The starting position may be the neutral position in which the friction ball spindles are parallel with the hub axle in which the transmission ratio is 1:1. By pivoting the cam plates in one direction or the other against the spring force of the restoring spring, it is possible to increase or decrease the transmission ratio.

In order to be able readily to dissipate to the vehicle frame the reaction torques which occur during operation, the invention provides a lever which can be fixed to the vehicle and which is rotationally rigidly connected to the hub axle. Like the brake levers of conventional back pedal brake hubs, this lever can be fixed on the vehicle frame.

So that the gear mechanism can stop when the drive is not being actuated while travelling and so does not generate any additional losses, the coupling arrangement does according to the invention comprise a ratchet free wheel coupling which may comprise, rotationally rigidly connected to the hub sleeve, a pawl carrier on which pawls are mounted which engage ratchet teeth on a disc coupled to the driven ring.

With increasing torque acting on the driving hub, in order also to obtain an increasing applied pressure at which the friction balls bear on the substantially conically constructed inner peripheral surfaces (races) which are directed towards the axis of the hub and which carry the driving ring and the driven ring, there is according to the invention at least one expanding coupling in the path of force between drive and hub sleeve. With increasing torque, this expanding coupling moves the driving ring and the driven ring increasingly towards each other in an axial direction so that the driving pressure is correspondingly increased.

It is particularly preferable for the driving ring and the driven ring each to be provided with its own expanding coupling. As the torque increases, therefore, driving ring and driven ring move in the same way towards each other in an axial direction so that the axial forces acting on the balls remain in equilibrium. Accordingly, the balls are not displaced in an axial direction which simplifies their mounting and the control of the pivoting movement of the bearing spindles. In connection with the aforementioned pre-tensioning spring element for axial pre-tensioning of the ring bearing on the inside face of the balls, there is a freedom of clearance in the entire system with substantially slip-free operation both at low torque and also at high torque. At low torque, the applied pressures are correspondingly lower so that in this case a particularly smooth travel is obtained. The two expanding couplings result in an even loading and thus to satisfactory centring of the friction balls.

Simple construction with reliable and long-lasting operation are guaranteed in that the expanding couplings comprise balls which are disposed in recesses in the driving ring and a driving pulley opposite to it, as well as in recesses in the driven ring and a thrust ring which is opposite to it, the recesses being bounded in a peripheral direction by sloping surfaces.

A particularly favourable further development of the invention is characterised by, disposed inside the hub sleeve and engaging around the driving ring as well as the driven ring, a sleeve disposed centrally in relation to the axis and which is coupled to the driving ring and the driven ring to accommodate axial forces acting between the driving ring and the driven ring. Consequently, since the sleeve absorbs the inner axial forces, the other component parts, particularly to two-part hub axle with the transmission housing carrying the friction balls and also the hub sleeve, are relieved of these axial forces.

A simple and at the same time mechanically stable construction which can also accommodate high axial forces is guaranteed in that at one of its axial ends the sleeve is rigidly connected to a thrust ring coupled to the driven ring while at its other axial end it is rigidly connected to a sleeve disc which is braced on a drive pulley coupled to the driving ring and disposed between the sleeve disc and the driving ring.

A contributory factor to this simple mechanically rugged construction is also an inclined ball-bearing provided between sleeve disc and driving pulley, in conjunction with an expanding coupling between the drive pulley and the driving ring as well as between the driven pulley and the thrust spring. The resulting inner axial forces and radial forces can be compensated by this single inclined ball-bearing. Furthermore, this arrangement has the advantage that the parts connected to one another via the inclined ball-bearing, namely the sleeve disc and the driving pulley are operated at rotary speeds which correspond to the driving speed or output drive speed. In the midway position of the gear mechanism (ball spindles parallel with the axis of the hub), these parts therefore rotate at the same speed so that there can be no friction losses in the inclined ball-bearing. Similarly, the choice of the inclined ball-bearing encourages trouble-free movement of the relevant parts on one another and facilitates pre-adjustment of the gear mechanism by means of screw connections because of the slow transition from the pre-tensioned adjustment to the loose adjustment provided by inclined ball-bearings. This transition can be additionally influenced by the choice of bevel radii. Furthermore, the helical ball-bearing which acts as an axial thrust bearing allows a small amount of tiltingly movable guidance of the parts in respect of one another so that inaccuracies caused by the serial connection of the two expanding couplings and manufacturing inaccuracy can be compensated.

For the reasons stated, it is also advantageous to provide a further inclined ball-bearing, namely between an end wall of the hub sleeve and the driver.

The various features of novelty which characterise the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE DRAWINGS

Figure 1:
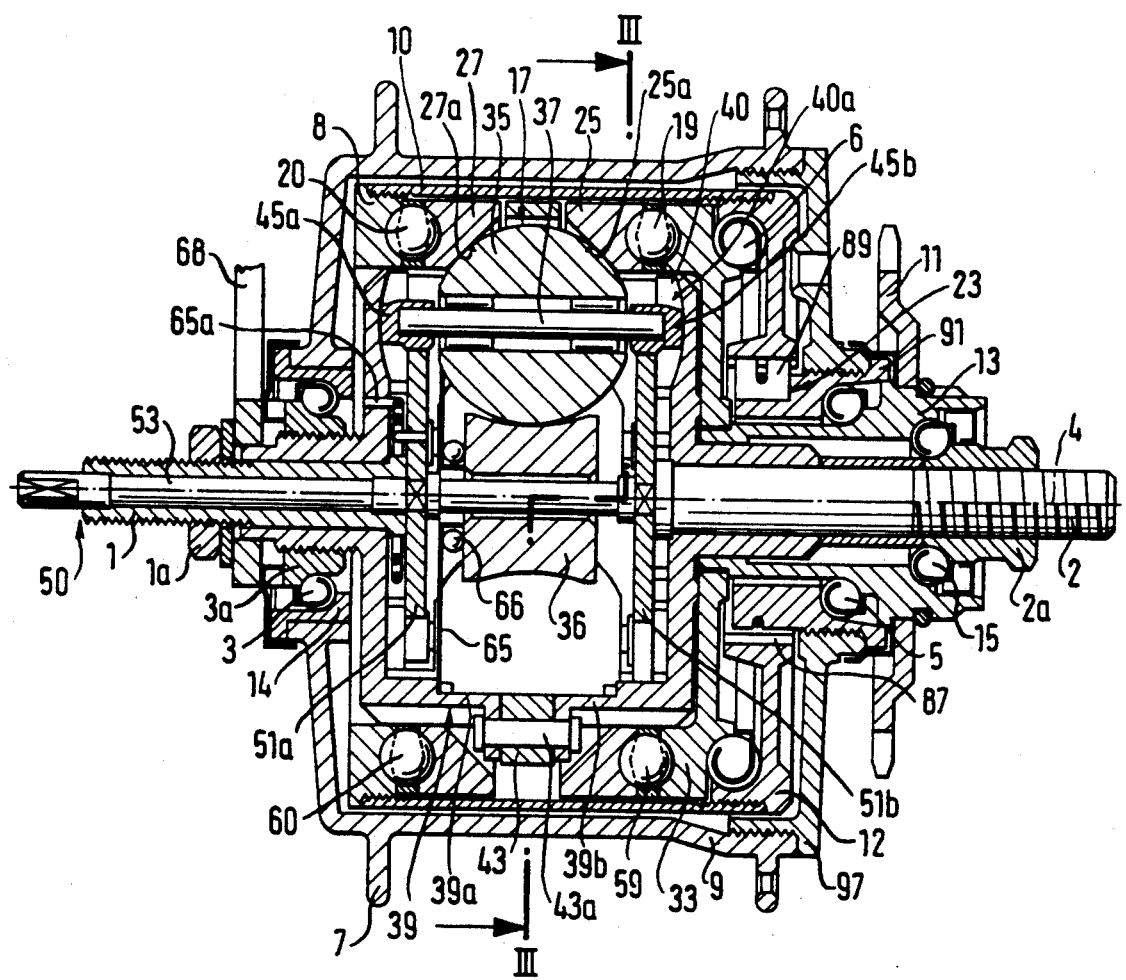
FIG. 1 is a longitudinal axial section through the driving hub showing only one of several balls.
Figure 2:
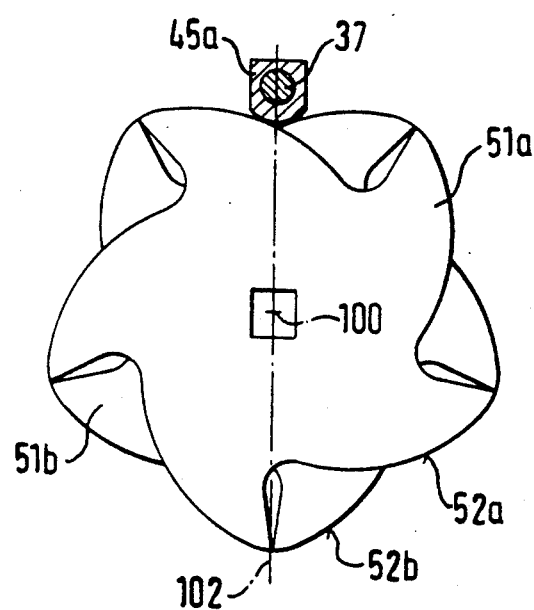
FIG. 2 shows the two cam plates of the control arrangement with the disposition of a sliding block.

The driving hub shown in the drawings comprises on the control side a half-axle 1 and on the drive side a half-axle 2 which for the purposes of hub fixing are disposed in the bicycle frame rotationally rigidly in the hub. Nuts 1a and 2a constitute the counter surfaces which together with axial nuts not shown here constitute the attachment to the wheel-mounting ends of the rear frame. The nut 2a forms together with a driver 13 a ball-bearing 15; on the driver 13 and rigidly connected to a screw cap 97 is a pawl carrier 91 which is likewise disposed to rotate via a ball-bearing 5. The screw cap 97 is part of the assembly of a hub sleeve 9 which also includes a bearing outer ring 14 which is likewise rotationally rigidly connected to the hub sleeve 9.

On the drive side, the hub sleeve 9 is mounted at the drive end via the ball-bearings 5 and 15 on the driving half-axle 2 while on the driven end it is mounted on the bearing outer ring 14 via a ball-bearing 3 with a positioning cone 3a on the half-axle 1, a ball carrier disc 39a which can be rigidly connected to the half-axle 1 being disposed between the cone 3a and the axle half 1. Inside the hub sleeve 9 is a ball friction gear 17 with a gear casing 39 composed of the ball carrier disc 39a and opposite it a ball carrier disc 39b and a carrier ring 43 and which are rigidly connected to one another—as shown in our example—by rivets 43a.

Before these three parts 39a, 39b and 43 are assembled, a control arrangement 50 consisting of cam plates 51a, 51b and an axis of rotation 53 are inserted followed by the two axle halves 1 and 2, a guide ring 36 with a plate spring 65 and a ball bearing 66. Finally, balls 35 are inserted each provided with ball spindles 37, which spindles penetrate the balls centrally and are connected rotatably to the balls through rolling friction bearings, and are provided with sliding blocks 45a and 45b at both ends of the ball spindles. In the described preferred embodiment the ball spindles 37 (=ball axles) do not rotate with the balls 35.

The cam plate 51a of the control arrangement 50 is so connected to the ball carrier disc 39 through a restoring spring 65a that the initial tension is sufficient to retrorotate the cam plates 51a, 51b over the entire rotary switching path which is imposed on the cam plates from outside via the pivot axis 53 in one direction or the other. The cam plates 51a and 51b are form-lockingly connected to the pivot axis 53, by a plug-in connection which is axially separably but in the direction of rotation substantially clearance-free. Once fitting is completed, then, a sub-assembly of the ball friction gear 17 is created which can be used as a basic gear box, for example for repair purposes.

Adjacent the basic gear box are the already mentioned rings, a driving ring 25 and a driven ring 27, both of which are in constant frictional contact with the balls 35. For the proportional application of pressure and compensation of the axial spacing tolerances, expanding clutches 19 and 20 apply and by their suitability of going along with or generating axial gap fluctuations, are in a position even with intensely increasing inner axial forces, to centre the balls 35 in their midway position. What are involved are minor relative movements on these expanding couplings which occur at whichever ring 25 or 27 happens at that moment to be transmitting the greater amount of torque. The outcome of this is that at least only one of the two expanding couplings takes over the feeding work.

Therefore, the flow of force in the hub follows this pattern: the torque generated by the user is passed through a chain sprocket 11 into the driver 13 which is in static equilibrium through its ball-bearings 5 and 15 while at the inner hub end it is form-lockingly rotationally rigidly and insertably connected to a drive pulley 33 so that the torque can be passed on to the expanding coupling 19, this driving pulley 33 at the same time representing the (in relation to the ball friction gear 17) axially outer part of the expanding coupling 19 with its rising panels. The driving pulley 33 is in static equilibrium due to a helical ball-bearing 6 which takes over the task of compensating for axial forces which arise in the ball friction gearing 17 and at the same time ascertaining the construction-related possible and necessary centring tasks. The inclined ball-bearing 6 is biased on one side on the drive pulley 33 and on the other on a sleeve disc 12.

Furthermore, the sleeve disc 12 is connected via a sleeve 10 by means of screwed connections to a sleeve thrust ring 8 which belongs to the expanding coupling 20 in conjunction with the driven ring 27. The expanding couplings 19 and 20 generate their axial spread by balls 59 between the driving pulley 33 and the driving ring 25 and by balls 60 between driven ring 27 and sleeve thrust ring 8 which in known manner lie on both annular sides in helical rising fields (recesses with lateral oblique surfaces) and run onto these oblique surfaces when the partner rings (driving ring 25 and driven ring 27) have to be rotated in opposition to each other so building up the axial thrust between the partners, after the axially possible ways have been exhausted. The path of force therefore is directed from the driving ring 25 to the driven ring 27 via the balls 35, the substantially conical races 25a and 27a of the rings 25 and 27, facing the axis 4, exerting radially inwardly directed forces on the balls 35 which are however absorbed by the guide ring 36 which co-rotates with the balls 35 with no clearance and, so to speak, forms the inner ring of a ball-bearing, adapted to rotate freely on the axis of rotation 53. Consequently, the mountings of the balls 35 on the ball spindles 37 are kept clear of these considerable radial forces.

Figure 3:
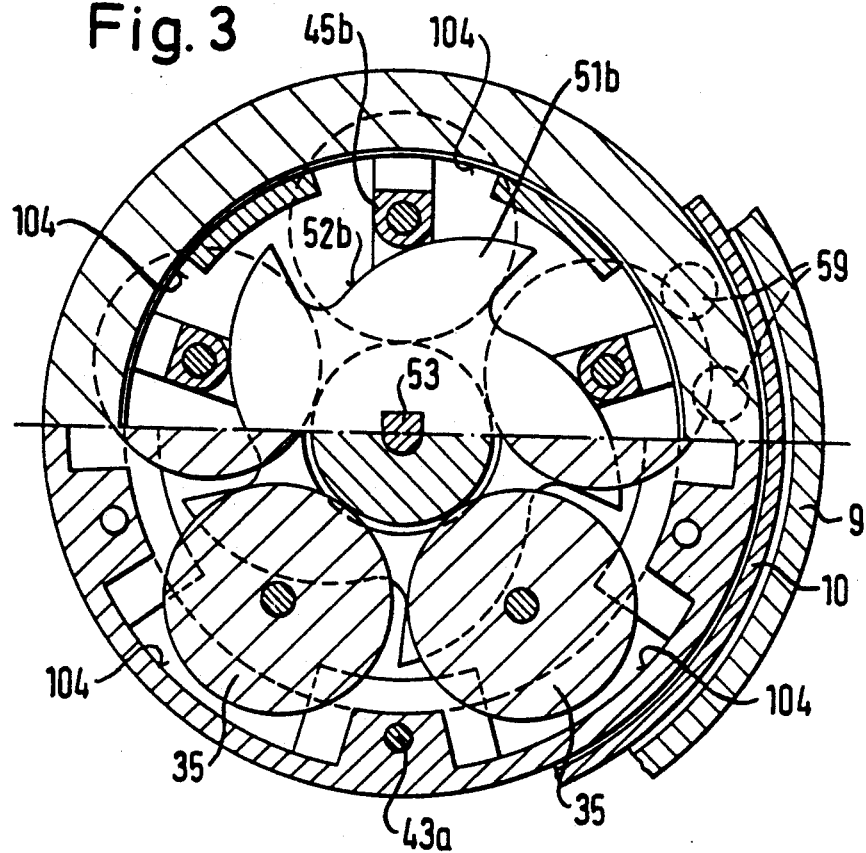
FIG. 3 shows a partial broken-away radial section through the driving hub taken on the line III—III in FIG. 1

The races 25a and 27a of the rings 25 and 27 and which are towards the balls 35 can —as shown in FIGS. 1 and 3—display a straight generatrix. For better attuning of the driving moments to the axial forces, the races may also have concavely curved generatrices with a plane of intersection as shown in FIGS. 1 and 3, with a radius of curvature which is greater than the radius of the balls 35. The flow of force, after passing through the ball friction gear 17 via the sleeve 10, has reached the sleeve disc 12 which carries ratchet teeth 87 on its inside diameter to constitute the input part of a ratchet free wheel coupling 23. Pawls 89 are rotationally rigid in a pawl carrier 91 and couple this latter to the sleeve disc 12 in the direction of driving rotation. The pawl carrier 91 is however a fixed component of the hub sleeve 9 to which it is connected by the screw cap 97. The statically defined mounting of the hub sleeve 9 is accomplished via the outer ring 14 of the ball-bearing 3, of which the positioning cone 3a is screwable, so that the ball-bearings 5 and 15 which are constructed as helical ball-bearings, are pushed into their clearance-free position.

As already mentioned, the mountings of the balls 35 on their ball spindles 37 are free from radial forces. However, tangential forces have to be supported there. These are generated by the friction forces of driving ring 25 and driven ring 27 with the balls 35, oppositely directed tangential forces resulting which seek to rotate the balls 35 about an axis which is at a right-angle to the central axis 4 and passes through the centre M of the balls 35. The resulting forces are passed from the ball spindles 37 through the sliding blocks 45a and 45b in each case to the flanks 40a of radially extending grooves 40 into the ball carrier discs 39a and 39b where they are received, since the two ball carrier discs 39a and 39b are, by means of the carrier ring 43, coupled so that they cannot rotate in respect of each other. Nevertheless, when the ball spindles 37 are pivoted out of the midway position shown in the drawings (see FIG. 4), there is left a differential moment which according to the transmission setting is directed to be forwardly or rearwardly rotating and this is passed from the body gear mechanism to the frame of the vehicle. It is therefore indicated preferably to connect the ball carrier disc 39a to the frame of the vehicle via a lever 68 which is rotationally rigidly and as far as possible form-lockingly connected to it, as is usual in the case of braking reaction moments which have to be dissipated in the case of back-pedal brakes.

The adjustment of the ball friction gear 17 depends on the precision of assembly of the sleeve 10 with the sleeve disc 12 and the sleeve thrust ring 8. The total of axial tolerances is offset by the choice of bevel radii of the helical ball-bearing 6, the plate spring 65 in conjunction with the ball-bearing 66 providing for compensation of a possible residual clearance in that it displaces the guide ring 36 axially and so pushes the balls 35 with ball spindles 37 and sliding blocks 45a and 45b radially outwardly against the rings 25 and 27. This results in the instantaneous build-up of axial forces at the expanding couplings 19 and 20 and backlash in the drive is minimised.

Control of the transmission ratio is brought about via the control arrangement 50 with which the ball spindles 37 are pivoted in whichever plane is common with the centre axis. This pivoting takes place in stepless fashion since the sliding blocks 45a and 45b slide along the cams 52a and 52b of the cam plates 51a and 51b when the pivot spindle 53 is rotated at control levers not shown here when the user of the bicycle moves the controls. For example, if the ball spindles 37 are pivoted out of their midway position shown in the drawings, so to speak normal gear, in which the driving speed is equal to the driven speed, for example in the top gear direction, then they must be pivoted in an anti-clockwise direction which causes the driving ring 25 to move onto a smaller contact circle (envelope circle) of the balls 35 while the driven ring, upon one rotation of the balls, is driven from a larger circle of contact, in other words it turns more quickly.

Figure 4:
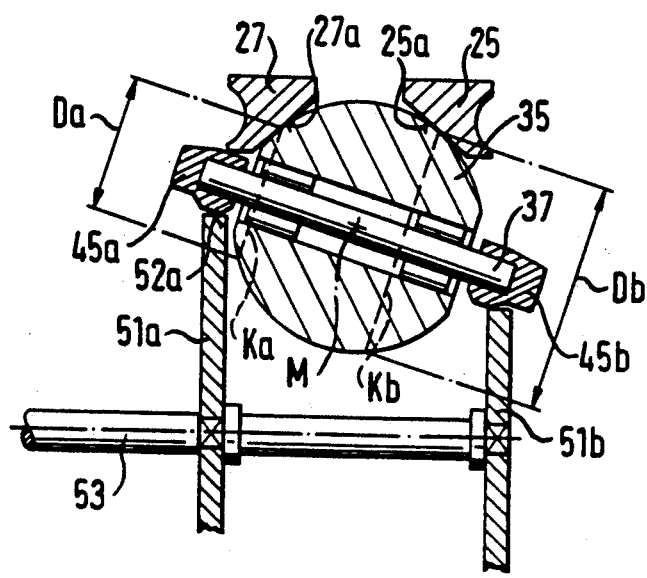
FIG. 4 is an axial longitudinal section through the central portion of the driving hub in a position of the control arrangement which is other than that shown in FIG. 1.

Conversely, if it is desired to change to a climbing (hill) gear with a corresponding transmission ratio, then the ball spindles 37 have to be pivoted in a clockwise direction shown in FIGS. 1 and 4, for example into the position shown in FIGS. 4. This pivoting movement of the spindles 37 is brought about by turning of the pivot spindle 53 of the control arrangement in a clockwise direction as shown in FIG. 3, which can be performed manually or possibly also by means of an appropriate servomotor. Consequently, the sliding blocks 45b slide along the cams 52b of the cam plate 51b radially inwardly whereas the sliding blocks 45a slide along the cams 52a of the cam plate 51a radially outwardly. In this way, the ball spindle 37 is pivoted in the appropriate direction about the ball centre M.

According to FIG. 4, there is an enlarged circle of contact Kb along which the ball 35 rolls on the race or in the track 25a of the driving ring, and a reduced circle of contact Ka on which the ball 35 rolls on the track or race 27a of the driven ring 27. The diameter of the contact circle Ka is designated Da in FIG. 4 while the diameter of the contact circle Kb is designated Db. The transmission ratio n2:n1 of the driving hub, n2 denoting the rotary speed of the hub sleeve 9 and n1 the rotary speed of the driver 13, then corresponds to the ratio Da:Db.

Where control is concerned, what is important is that the sliding block 45b is pushed outwardly by the cam 52b on the cam plate 51b whereas the sliding block 45a of the cam 52a on the cam plate 51a ought as far as possible to follow without clearance so that when the direction of shift is changed, there is no undesired backlash. Since the sliding blocks 45a and 45b move axially in relation to the cam plates 51a and 51b, it is envisaged that the shape of the contact surface on the sliding blocks 45a and 45b should be that of a ball cup by means of which it is possible to create curves 52a and 52b which are mirrored opposites of each other (transition from one curve to the other by rotation through 180° about an axis 102 which is at right-angles to the axis 4), which is advantageous from the point of view of manufacture.

The gear case 39 which is constructed as a friction ball carrier is mechanically rugged while at the same time being capable of simple assembly. It encloses the control arrangement and is provided with recesses 104 which can be seen in FIG. 3 and by which the (in the example of embodiment illustrated) total of 5 balls can extend radially outwardly to apply force to the driving ring 25 and the driven ring 27.

While specific embodiments of the invention have been shown and described in detail to illustrate the application of the inventive principles, it will be understood that the invention may be embodied otherwise without departing from such principles.

What I claim is:

1. A driving hub for a vehicle, particularly a bicycle, comprising
    a hub axle (1, 2) which establishes an axis (4) of the hub,
    a hub sleeve (9) which equiaxially encloses and is rotatable in relation to the hub axle (1, 2),
    a driver (13) mounted to rotate in relation to the hub sleeve (9) and the hub axle (1, 2),
    a friction gear disposed inside the hub sleeve (9) in the path of force between the driver (13) and the hub sleeve (9),
    at least one coupling arrangement (23) which, when the drive is being provided by the driver (13), closes the path of force between driver (13) and hub sleeve (9) and opens the path of force when the driver (13) is not driving,
    a control arrangement (50) which can be actuated from outside, for the infinitely variable adjustment of the transmission ratio of the friction gear (17),
wherein the friction gear is constructed as a ball friction gear (17), comprising
    two axially oppositely disposed rings, a driving ring (25) and a driven ring (27),
    distributed in the peripheral direction of the rings (25, 27) and connecting the rings to one another frictionally, a plurality of friction balls (35) which are rotatably mounted by means of ball spindles (37) and
    rotationally rigidly connected to the hub axle (1, 2) a friction ball carrier on which the friction balls (35) with their ball spindles (37) are mounted to pivot in a plane containing the axis (4) of the hub,
wherein the driving ring (25) and the driven ring (27) are in frictional contact with the friction balls (35) on the side of the friction balls (35) which faces away from the axis (4), and wherein the control arrangement (50) is constructed for joint pivoting of the ball spindles (37).

2. A driving hub according to claim 1, wherein the hub axle is constructed in two parts with two half-axles (1 and 2), each having one axial end, said ends being disposed inside the hub and spaced apart from each other and being provided each with a ball carrier disc (39a, 39b) mounted to said respective end for joint rotation, the ball carrier discs (39a, 39b) being rigidly connected to each other to form a transmission housing (39), said transmission housing (39) being constructed as a friction ball carrier.

3. A driving hub according to claim 2, wherein the two ball carrier discs (39a, 39b) are rigidly connected to each other by a ring (43).

4. A driving hub according to claim 2 wherein the ball carrier discs (39a, 39b) are provided with radially extending grooves (40) to receive the corresponding ends of the ball spindles (37).

5. A driving hub according to claim 4, wherein the ends of the ball spindles (37) are provided with sliding blocks (45a, 45b) which are inserted into the radially extending grooves (40) of the ball carrier discs (39a, 39b).

6. A driving hub according to claim 5, wherein the grooves (40) are of a width which corresponds to that of the sliding blocks (45a, 45b) plus a reasonable clearance for movement.

7. A driving hub according to claim 1, wherein the control arrangement (50) comprises a pivot axis (53) and, rotationally rigidly coupled thereto, two cam plates (51a, 51b), said cam plates (51a, 51b) being disposed on both sides of the friction balls (35), the ends of the ball spindles (37) bearing on the cams (52a, 52b) of the cam plates (51a, 51b) and wherein the cams (52a, 52b) are constructed with oppositely extending directions of pitch, for pivoting the ball spindles (37) about the centre point of the friction balls (35) upon rotation of the cam plates (51a, 51b) in relation to the friction ball carrier.

8. A driving hub according to claim 7, wherein the friction balls (35) are rotatably mounted on their ball spindles (37), both ends of each of these ball spindles (37) being connected to sliding blocks (45a, 45b) which in turn contact the cams (52a, 52b) on the cam plates (51a, 51b).

9. A driving hub according to claim 8, wherein the contacting surfaces of the sliding blocks (45a, 45b) on the cams (52a, 52b) of the cam plates (51a, 51b) are constructed in the form of a spherical calotte.

10. A driving hub according to claim 7, wherein the cams (52a, 52b) on the two cam plates (51a, 51b) are so symmetrically constructed in relation to each other that they merge into each other by a 180 degree rotation about an axis (102) which is at right angles to the axis (4) of the hub.

11. A driving hub according to claim 1, wherein all friction balls (35) are braced against the outer periphery of a ring (36) mounted in the driving hub and rotatable about the axis (4).

12. A driving hub according to claim 11, wherein the ring (36) is mounted for axial movement in the driving hub and comprises, extending at an angle to the axis (4), a portion of the peripheral surface on which the friction balls (35) roll for pre-tensioning of the friction balls (35) radially outwardly by corresponding axial displacement of the rings (36) in a pre-tensioning direction.

13. A driving hub according to claim 12, wherein a pre-tensioning spring element for axial pre-tensioning of the ring (36) in the pre-tensioning direction is provided.

14. A driving hub according to claim 13, wherein the pre-tensioning spring element is constructed as a plate spring (65).

15. A driving hub according to claim 12, wherein the outer periphery of the ring (36) has a middle portion with a toroidal concave curvature with a torus radius which exceeds the radius of the friction balls (35) and adjacent the two sides thereof conical portions of a diameter which increases with increasing distance from the middle portion.

16. A driving hub according to claim 1, wherein a restoring spring (65a) is provided which pre-tensions the control arrangement (50) into a starting position.

17. A driving hub according to claim 1, wherein a lever (68) for transmitting reaction moments of the ball friction gear to the vehicle is rigidly connected to the hub axle (1, 2) and adapted to be fixed to the vehicle.

18. A driving hub according to claim 1, wherein the coupling arrangement comprises a ratchet free wheel coupling (23).

19. A driving hub according to claim 18, wherein the ratchet free wheel coupling (23) comprises, rigidly connected to the hub sleeve (9), a pawl carrier (91) on which are mounted pawls (89) which engage ratchet teeth (87) on a pulley (12) coupled to the driven ring (27).

20. A driving hub according to claim 1, wherein at least one expanding coupling (19, 20) is provided in the force path between driver (13) and hub sleeve (9).

21. A driving hub according to claim 20, wherein the driving ring (25) and the driven ring (27) are each provided with an expanding coupling (19, 20).

22. A driving hub according to claim 21, wherein the expanding couplings (19, 20) comprise balls (59) which are disposed within recesses in the driving ring (25) and within recesses of a driving pulley (33) as well as balls (60) which are disposed within recesses in the driven ring (27) and within recesses of a thrust ring (8), the recesses being defined by sloping surfaces in the peripheral direction.

23. A driving hub according to claim 1, wherein a sleeve (10) is disposed inside the hub sleeve (9) in coaxial relation to the axle (100), said sleeve encircling said driving ring (25) as well as said driven ring (27) and being coupled to the driving ring (25) and the driven ring (27) to accommodate axial forces acting between the driving ring (25) and the driven ring (27).

24. A driving hub according to claim 23, wherein at one of its axial ends, the sleeve (10) is rigidly connected to a thrust ring (8) coupled to the driven ring (27) while at its other axial end it is rigidly connected to a sleeve pulley (12) which is biased on a driving pulley (33) coupled to the drive ring (25) and disposed between the sleeve pulley (12) and the driving ring (25).

25. A driving hub according to claim 24, wherein an inclined ball bearing (6) is provided between sleeve pulley (12) and driving pulley (33) and wherein an expanding coupling (19, 20) is provided between driving pulley (30) and driving ring (25) as well as between driven pulley (27) and thrust ring (8).

26. A driving hub according to claim 1, wherein an inclined ball bearing (5) is provided between an end wall of the hub sleeve (9) and the driver (13).

* * * * *